United States Patent
Yseboodt et al.

(10) Patent No.: US 10,069,636 B2
(45) Date of Patent: Sep. 4, 2018

(54) POWER DISTRIBUTION SYSTEM WITH LOW COMPLEXITY AND LOW POWER CONSUMPTION

(71) Applicant: PHILIPS LIGHTING HOLDING B.V., Eindhoven (NL)

(72) Inventors: Lennart Yseboodt, Eindhoven (NL); Stefan Marcus Verbrugh, Eindhoven (NL); Matthias Wendt, Eindhoven (NL); Bob Bernardus Anthonius Theunissen, Eindhoven (NL); Henricus Theodorus Van Der Zanden, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/112,424

(22) PCT Filed: Jan. 14, 2015

(86) PCT No.: PCT/EP2015/050539
§ 371 (c)(1),
(2) Date: Jul. 18, 2016

(87) PCT Pub. No.: WO2015/110324
PCT Pub. Date: Jul. 30, 2015

(65) Prior Publication Data
US 2016/0337137 A1    Nov. 17, 2016

(30) Foreign Application Priority Data

Jan. 22, 2014  (EP) ..................................... 14152142

(51) Int. Cl.
*H04L 12/10* (2006.01)
*H04L 12/46* (2006.01)
(Continued)

(52) U.S. Cl.
CPC ........ *H04L 12/10* (2013.01); *H04L 12/40039* (2013.01); *H04L 12/40045* (2013.01); *H04L 12/462* (2013.01); *H04L 43/12* (2013.01)

(58) Field of Classification Search
None
See application file for complete search history.

(56) References Cited

U.S. PATENT DOCUMENTS 7,587,289 B1 * 9/2009 Sivertsen .................. F21K 9/00
                                                          362/147
2004/0105435 A1  6/2004 Morioka
(Continued)

FOREIGN PATENT DOCUMENTS

WO    2012028981 A1    3/2012

*Primary Examiner* — Kodzovi Acolatse

(57) ABSTRACT

The invention relates a system for controlling distribution of power to load elements via network connections (e.g. LAN). Low cost luminaires or other load elements can be powered via LAN connections (e.g. by power over Ethernet (PoE)) without featuring an Internet Protocol (IP) node. This is attractive because with such a system the installation cost down benefits of PoE can be applied also to installations that do not require advanced controls. This means that to switch them on or off, the power supply on the LAN port of the switch must be enabled or disabled. When load elements and load controllers (e.g. lighting controllers or light switches) are connected to the same switch, they are automatically paired to each other. This can be achieved through use of a network management protocol capability that some network switches have. This allows for easy installation and automatic intuitive commissioning.

10 Claims, 4 Drawing Sheets

(51) Int. Cl.
*H04L 12/40* (2006.01)
*H04L 12/26* (2006.01)

(56) References Cited

U.S. PATENT DOCUMENTS

| | | |
|---|---|---|
| 2007/0075586 A1 | 4/2007 | Bogue |
| 2008/0140813 A1 | 6/2008 | Ratcliff et al. |
| 2008/0197790 A1 | 8/2008 | Mangiaracina et al. |
| 2009/0323257 A1* | 12/2009 | Sarid ............... H02G 3/00 361/631 |
| 2010/0026215 A1* | 2/2010 | Warton ............ H05B 37/0254 315/362 |
| 2010/0031070 A1* | 2/2010 | Tomomitsu ............ H04L 12/10 713/300 |
| 2010/0171602 A1 | 7/2010 | Kabbara et al. |
| 2010/0205466 A1 | 8/2010 | Diab et al. |
| 2011/0241425 A1 | 10/2011 | Hunter, Jr. et al. |
| 2012/0271477 A1 | 10/2012 | Okubo et al. |
| 2014/0180723 A1* | 6/2014 | Cote ............... G06Q 40/08 705/4 |
| 2015/0181680 A1* | 6/2015 | Wang ............ H05B 37/0254 315/294 |

* cited by examiner

POWER DISTRIBUTION SYSTEM WITH LOW COMPLEXITY AND LOW POWER CONSUMPTION

CROSS-REFERENCE TO PRIOR APPLICATIONS

This application is the U.S. National Phase application under 35 U.S.C. § 371 of International Application No. PCT/EP2015/050539, filed on Jan. 14, 2015, which claims the benefit of European Patent Application No. 14152142.7, filed on Jan. 22, 2014. These applications are hereby incorporated by reference herein.

FIELD OF THE INVENTION

The invention relates to the field of systems for controlling distribution of power to load elements, such as—but not limited to—lamps or luminaires of a lighting system, via network connections, e.g., local area network (LAN) connections.

BACKGROUND OF THE INVENTION

Smart objects are devices whose primary function is augmented with intelligent behavior and communication capabilities. Many everyday devices can be utilized more effectively, or in new ways, by embedding some intelligence in them. This trend is already apparent in some lighting products for the home and office market. Examples are daylight sensing or presence detection. These are simple examples of combining several objects with communication capabilities and making them more than the sum of their parts. As more and more devices will be equipped with micro processors and communication capabilities, more complex inter-device behaviors will emerge.

In order to control a luminaire or other load devices, it is very common today to send control signals from a (central) controller to the luminaire. For example, Digital Addressable Lighting Interface (DALI) and Digital Multiple (DMX) are very well known protocols to send commands for e.g. dimming from a light controller to a luminaire. DALI or DMX signals are distributed to the luminaires by wires and the luminaires are connected to the mains by separate and different wires.

A very likely candidate for a new communication backbone is the Internet, enabled through Ethernet or other LAN networking. Ethernet has the major advantage that it is everywhere, and due to the massive volumes involved, equipping a device with Ethernet communication means can be easily done at low costs. Ethernet was developed around 1975 by Xerox and has seen multiple upgrades and improvements since. Ever since Ethernet transitioned to the well known 8P8C/10BASE-T (or RJ45) connector and cabling, it has enjoyed full backward compatibility with older devices. Due to the enormous amount of devices compatible with this technology, this form of Ethernet is supposed to survive for many more years.

Most traffic on Ethernet networks is comprised of Internet Protocol (IP) packets. The Internet Protocol, standardized into RFC 791 around 1981, is the backbone of the Internet today. It allows packets to travel on this network in an efficient and robust way. More and more devices are joining the Internet, and most of them are not traditional personal computers (PC's) or laptops. The cellphone revolution put a communication device in everyone's pocket. The current smartphone revolution will connect everyone permanently to the Internet. This means that everyone carries devices that can interact with smart objects around us in several ways.

A very interesting recent addition to Ethernet is the capability to also deliver DC power over the Ethernet cables, while remaining fully compatible with equipment that does not make use of this. First standardized in 2003, the IEEE 802.3af standard allows up to 15 W of consumption by the Ethernet device. A second standard developed in 2009 pushes this to 25 W of power. The reason for this conservative limit is the desire to be compatible with thick bundles of cable. For some use cases this is not a requirement and manufacturers have created higher power Power over Ethernet (PoE) extensions. Power supply manufacturers are even offering products that deliver up to 95 W per Ethernet port or a power module with power transfer capabilities of up to 200 W over a single Ethernet cable. These high power extensions to PoE (not compliant with any IEEE standard, but usually providing a level of compatibility) are mostly used for emerging applications such as PoE laptops, televisions and high performance cameras. Although such power levels clearly require consideration on cable layout, it provides the potential to power even very powerful luminaries directly from the Ethernet switch.

PoE is a standardized way to transfer power and data to a device. PoE is increasingly used for e.g. surveillance cameras, Voice over IP (VoIP) phones, computer monitors and even luminaires. It can be used for all kinds of low power loads like lighting equipment (sensors, switches, light sources etc.) or entertainment appliances like active speakers, internet radios, DVD player, set-top boxes and even TV sets. An advantage of this is that the power and the control data are transmitted through the same cable. This means that it is not necessary to install separate cables for power and for data (as is the case if data is provided by e.g. DALI). For PoE, Cat5 cables can be used. These cables are generally available in a wide variety of lengths and at very low cost. Alternatively Cat6 or Cat7 cables can be used.

Most PoE switches offer the possibility to manage the ports through commands according to the Simple Network Management Protocol (SNMP). SNMP enables e.g. the following functions:

switching on and off specific ports;
measuring the power that a PoE device is drawing from a specific port; and
setting timers to switch on/off ports at a given time:

FIG. 1 shows a schematic architecture of a PoE lighting installation. Two sets of N luminaires 10-1 to 20-N and 22-1 to 22-N are connected to respective PoE switches 10, 12 and data (Ethernet) and power (PoE) are transmitted from the PoE switches 10, 12 to each luminaire by a Cat5 cable (or any other multiple wire cable). N can be any value, typically N may be in the range of 4 to 48. In the example of FIG. 1, power is supplied to the PoE switches 10, 12 via a power supply grid 110 and wired Ethernet is provided at each PoE switch via an Ethernet connection or bus 120. However, an Internet connection could also be provided via wireless connections. In FIG. 1, the two PoE switches 10, 12 are daisy chained by Cat5 cables to provide Ethernet to each PoE switch 10, 12. Either PoE switch has its respective luminaires 20-1 to 20-N or 22-1 to 22-N connected to it, but this could also be a combination of luminaires and other PoE devices. In the example in FIG. 1 there are two sensors 30, 32 connected to detect e.g. occupancy or the presence of daylight. The sensors 30, 32 can give commands to a specific subset of luminaires, e.g. to switch on when presence is detected.

FIG. 2 shows a more detailed architecture of the PoE lighting system of FIG. 1 with the PoE switch 10, luminaires 20-1 to 20-N and a user interface (UI) 40. A similar architecture is disclosed in the WO 2012/028981 A1, for example. In one luminaire 20-1 a driver 202 is shown. The drivers of the other luminaires are not shown. In the PoE switch 10 a power supply unit (PSU) 102 is indicated. Each luminaire 20-1 to 20-N and 22-1 to 22-N contains the driver 202 to apply the right current and voltage to the light source(s) which may be light emitting diodes (LEDs), phosphor converted LEDs, organic LEDs (OLEDs), laser diodes, phosphor converted laser diodes, fluorescent lamps, halogen lamps, high intensity discharge (HID) lamps and/or Ultra High Performance (UHP) lamps. The driver 202 may in general be dimmable and may dim according to signals that it receives from the UI 40. Also switching the light on and off can be controlled by data that are provided via the Ethernet connection. The UI 40 can be a PC that is connected to the PoE switches 10, 12 via Ethernet and that runs appropriate software to generate commands for the luminaires 20-1 to 20-N (e.g. dimming, switching on and off, etc).

Alternatively the UI 40 can be a dedicated device (e.g. a panel) providing the control data for the luminaires 20-1 to 20-N via the Ethernet connection 120.

The IP-controlled luminaires 20-1 to 20-N offer many advantages, as described above. However, the cost is high due to the need for Ethernet in each luminaire. In addition, when the luminaires 20-1 to 20-N are switched off, there is still some power consumption in the system since Ethernet is still active in each luminaire and since the PSU 102 in the PoE switch 10 is still on.

A further disadvantage is the size of the driver 202 that has to be accommodated in the luminaires 20-1 to 20-N. For some luminaire types this size is no issue, but for some luminaire types, miniaturization is a value driver.

US 2010/0171602 A1 discloses a management agent which has access to power output control circuitry of a digital electronic communication switch, a power meter, a load sharing means, and the ability to manage the power of switching circuits in the switch. The power meter enables the management agent to identify the power consumed by the switching circuits that are enabled and operational. This information, coupled with knowledge of the power allocated to each port via PoE, and policy information which specifies power allocation preferences is used in a two-pass power management method.

SUMMARY OF THE INVENTION

It is an object of the present invention to implement an LAN-based power distribution control system with low complexity and low power consumption, which is capable of switching individual load devices.

This object is achieved by a control device as claimed in claim 1, by a load device as claimed in claim 8, by a system as claimed in claim 9, by a method as claimed in claim 11, and by a computer program product as claimed in claim 14.

Accordingly, load devices (e.g. luminaires etc.) with low complexity can be provided and powered via LAN connections (e.g. by PoE) without featuring an IP node. This is attractive because with such a system the reduced installation effort and complexity of LAN-based power supply can be applied also to installations that do not require advanced controls. This can be achieved through use of a network management protocol capability that some network switches have. Furthermore, small size and low power consumption of the power distribution system can be achieved when only minimal functionality of the controlled load devices is required. In particular, the power consumption can be reduced when the controlled load devices are off. Moreover, the size of the luminaires can be minimized since no intelligence needs to be implemented.

According to a first aspect, the network switch may be discovered by employing a network scan and probing for an own network address in cache tables of a network management protocol compatible network switch. Thereby, automatic detection of the network switch for power distribution control can be achieved.

According to a second aspect which can be combined with the above first aspect, the selected LAN ports may be discovered by checking which layer-2 address cache tables (e.g. MAC address cache tables or look-up tables) of available LAN ports of said discovered network switch are empty or do not have a link-up. These discovered LAN ports (i.e. their addresses) may then be stored in a look-up table of the control device. Thus, a simple and straight forward approach for automatic commissioning of the power distribution control system can be provided. When the load devices (e.g. luminaires) and the control device (e.g. sensors) are connected to the same switch, they are automatically paired to each other.

According to a third aspect which can be combined with the above first or second aspect, the control device comprises a wall switch or a sensor for detecting presence of people and initiating a power switching operation in response to a result of detection, or a user interface for manually initiating said power switching operation, or a building management system for controlling lighting based on sensor inputs. This allows a wide range of implementation for the proposed low-complexity, low-power and low-size power distribution control system.

According to a fourth aspect which can be combined with at least one of the above first to third aspects, the network switch may be a midspan device. Thereby, the control device does not need to provide LAN functionality at its ports, so that power consumption of complexity of the whole power distribution control system can be further reduced.

According to a fifth aspect which can be combined with at least one of the first to fourth aspects, the network switch may be adapted to switch off a main power supply unit if all its LAN ports are switched off. This allows even further reduction of power consumption.

It is noted that the control device may be implemented based on discrete hardware circuitry with discrete hardware components, an integrated chip, or an arrangement of chip modules, or based on a signal processing device or chip controlled by a software routine or program stored in a memory, written on a computer readable medium, or downloaded from a network, such as the Internet.

It shall be understood that the control device of claim 1, the load device of claim 8, the system of claim 9, the method of claim 11 and the computer program product of claim 14 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a power distribution control system for a lighting system where individual luminaires are switched on at least one SNMP-controlled PoE switch.

A basis for the proposed embodiments is that PoE does not have to be combined with IP control. The PoE standard is specifically designed to allow PoE to be used without any IP control, or even without Ethernet data at all. This means that equipment can make use of PoE without the associated cost, complexity and power consumption of an IP node, saving a microcontroller and Ethernet transceiver. In the following embodiments, low cost luminaires are provided as so called 'dumb lamps' which do not feature intelligence or means to communicate, and a functional lighting system with these kind of luminaires is proposed.

The minimum amount of control that must be implemented is to be able to switch the dumb lamps on or off. With PoE, the mains supply to the PoE switch can be switched, but this is not desired in a PoE lighting system. This has the effect of switching on/off all luminaires that are connected to that switch. This would however also break the data link of all devices connected to that switch. Therefore, it should be possible to switch individual luminaires and also connect devices to the switch that require a continuous data link. Furthermore, the switching process may be too slow. It could take more than 1 min for lights to turn on after the mains is applied. The reason is that PoE authentication can take up to 2 s, and is done port by port.

According to various embodiments, the proposed power distribution control system comprises of PoE-only luminaires (i.e. dumb lamps) and uses a sensor or UI element as a control element to issue Simple Network Management Protocol (SNMP) commands to control lighting. SNMP is a protocol used to control various network equipments. It is used for instance by network administrators to determine which ports on a switch are used and even which Medium Access Control (MAC) addresses are associated with that port. SNMP is a common feature offered on high end professional switches.

Using SNMP is not the only way to control lighting. It is only described here as an example. Any protocol understood by a switch or midspan would suffice to accomplish the same purpose.

Furthermore, automatic commissioning between the control device and dumb PoE-only luminaires is proposed. The required link can be automatically formed between devices that are located on the same network switch (i.e. PoE switch). To achieve this, individual ports of the PoE switch are switched on and off by making use of SNMP.

Figure 1:
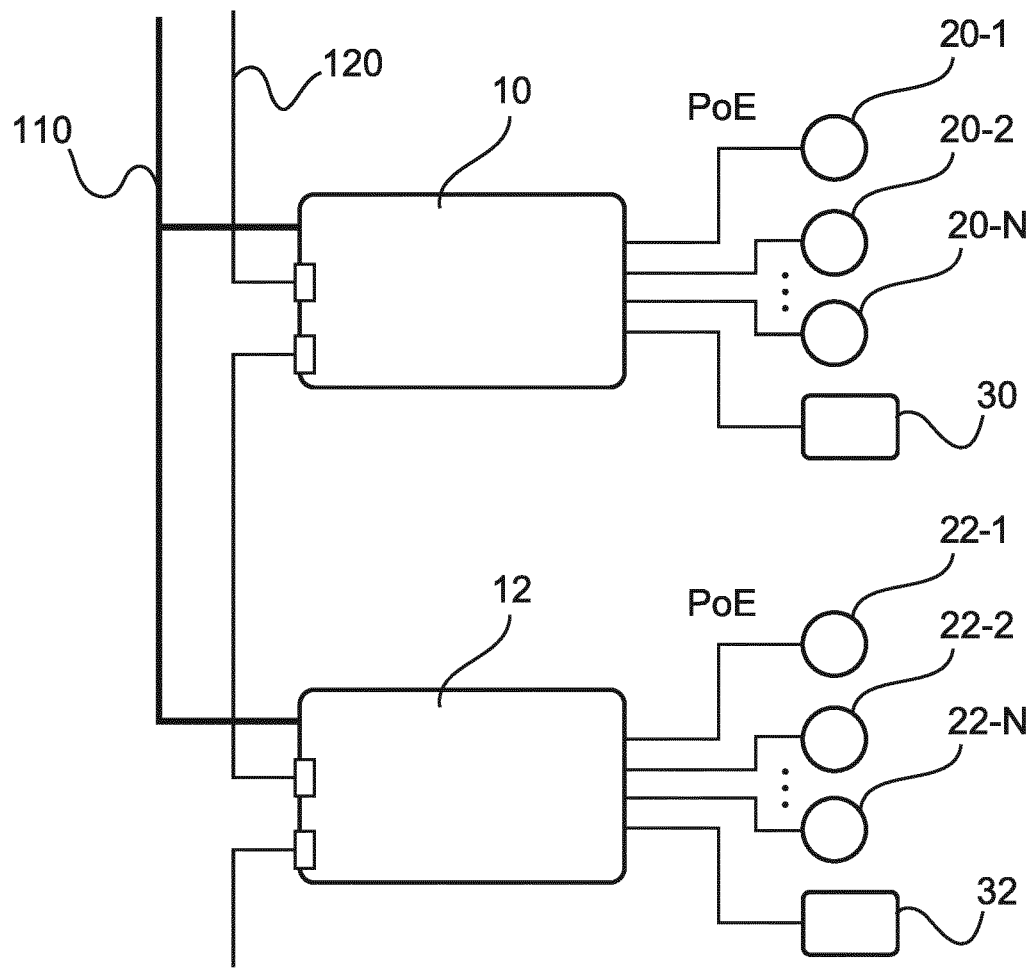
FIG. 1 shows a schematic architecture of a daisy chained PoE lighting installation.
Figure 2:
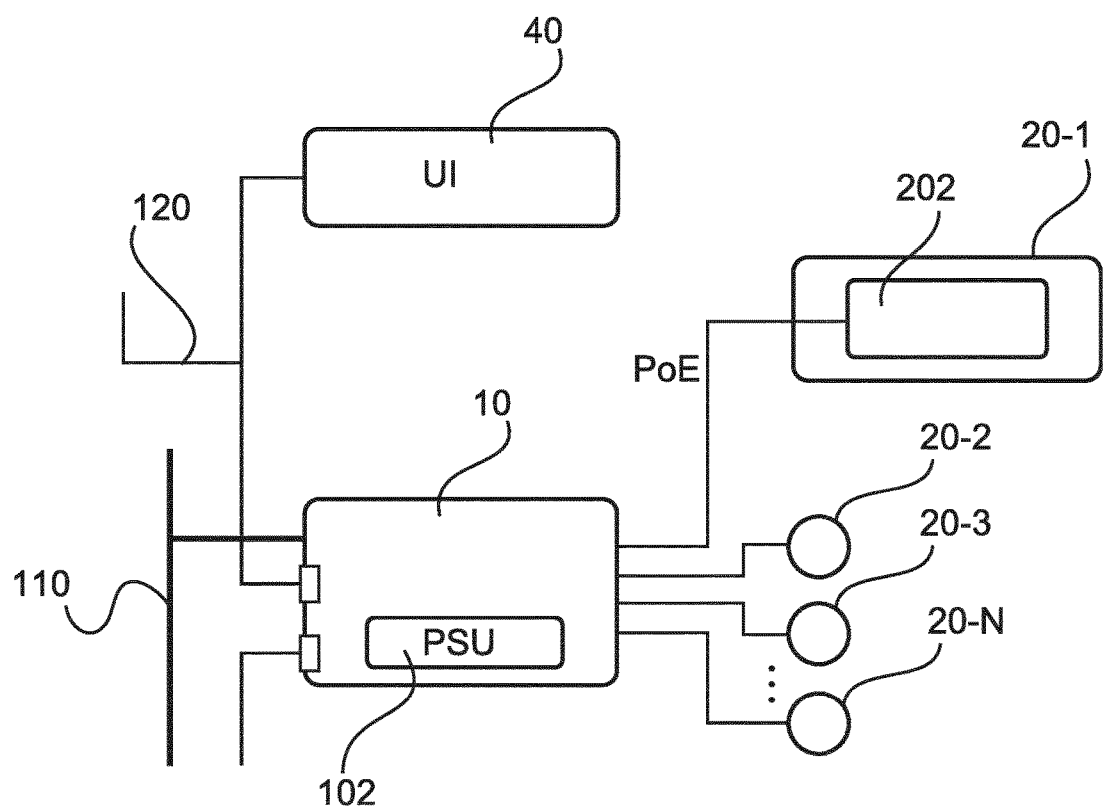
FIG. 2 shows a more detailed schematic block diagram of the PoE lighting installation of FIG. 1.
Figure 3:
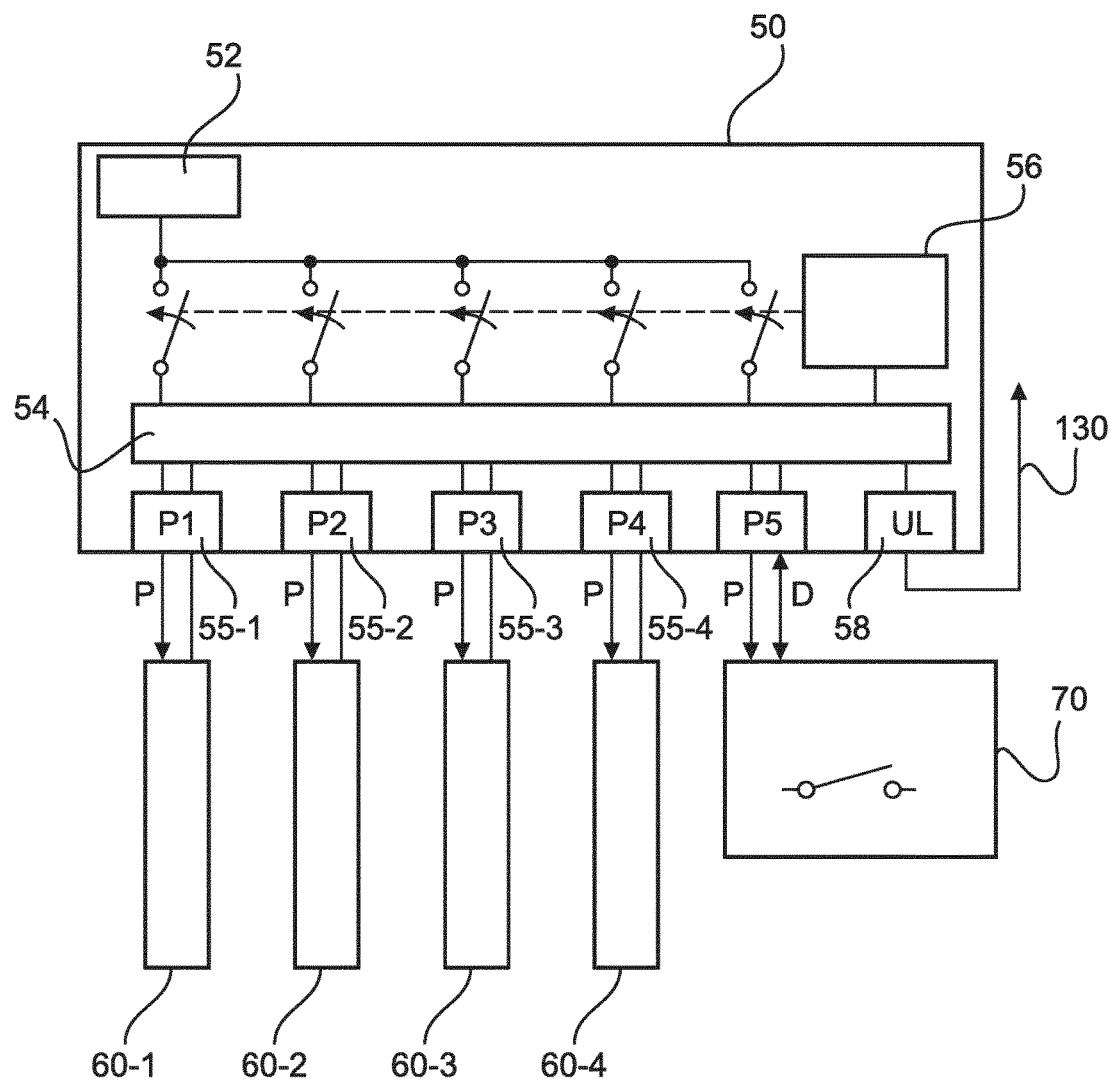
FIG. 3 shows a schematic block diagram of a power distribution control system according to a first embodiment.

FIG. 3 shows a schematic block diagram of a power distribution control system according to a first embodiment with an exemplary number of four dumb lamps 60-1 to 60-4 without any significant processing and/or communication capability. The dumb lamps 60-1 to 60-4 are powered by PoE but do not possess any significant processing/communication capability except what is necessary to transfer power via PoE (this may be embedded in the PoE power distribution integrated circuit). When voltage is applied through PoE, they will turn on and when there is no power, they will obviously be off.

The dumb lamps 60-1 to 60-4 or other kind of dumb loads are connected to a PoE switch 50. On the PoE switch 50 one or more controllers (i.e. on/off switches) 56 are provided with IP node functionality and SNMP capability. Furthermore, the supply of data and power to the ports 55-1 to 55-4 is achieved via a layer-2 network switch 54 based on respective MAC addresses. An uplink port (UL) 58 is provided for IP uplink traffic via a connection 130 to the Internet.

The power distribution control system automatically works such that toggling a light switch 70 (i.e. a lighting control switch or lighting controller) connected to an Ethernet port P5 of the PoE switch 50 disables supply of power from a main power supply unit (PSU) 52 via PoE connections P to those ports (P1 to P4) 55-1 to 55-4 of the PoE switch 50 that do not contain an IP node. Thus, to those ports to which the dumb lamps 60-1 to 60-4 are connected.

The light switch 70 is powered via a PoE connection P and sends commands via an Ethernet data connection D to the PoE switch 50 to switch specific ports on and off. The light switch 70 may be implemented as a simple wall switch or a sensor connected to the same Ethernet network as the PoE switch 50 and can switch on and off specific ones or all of the dumb lamps 60-1 to 60-4 when presence of people is detected. This can be done by sending commands to the PoE switch 50 to switch on and off specific ones or all of the PoE ports 55-1 to 55-4.

As an alternative option, the light switch 70 may be implemented as a UI adapted to manually switch off specific ones or all of the PoE ports 55-1 to 55-4.

As a further option, the light switch 70 may be implemented as a building management system which gets input from sensors and other devices and has a program running that controls the lighting (e.g. depending on the time of the day, day of the week).

To achieve this, the IP node of the light switch 70 must be able to figure out the IP address of the PoE switch 50 it is connected to. If it knows the IP address of the PoE switch 50 it is connected to, the IP node of the light switch 70 can then use SNMP to enable or disable power to the dumb loads. It also needs to know which of the ports (i.e. P1 to P4 in FIG. 3) of the PoE switch 50 has a dumb PoE lamp connected thereto, and which of the ports (i.e. P5 in FIG. 3) has a full IP node connected thereto. Only the dumb nodes at ports P1 to P4 should be switched.

Thus, the light switch 70 is capable of enabling/disabling PoE power supply individually per PoE port and querying MAC addresses lookup tables via SNMP. More specifically, the light switch 70 may discover what PoE switch it is connected to by employing an IP network scan and probing for its own MAC address in the cache tables of SNMP compatible network switches. Additionally, a way in which the light switch 70 may discover which PoE ports of the switch should be turned on/off when the light switch 70 is toggled is by checking which MAC cache tables of a certain PoE port are empty while a PoE device is present on the other side. An alternative is to simply look for PoE ports that do not have link-up, or have empty MAC cache tables.

The PoE switch 50 may be implemented by means of a midspan which then can be managed by means of SNMP commands in order to allow power-on/off control for certain ports. A midspan contains the power train of PoE without any data switching functionality. When the PoE switch 50 is a switch, it is commonly called an endspan or endpoint. Otherwise, if it is an intermediary device between a non-PoE capable switch and a PoE device, it is called a midspan. For example, an external PoE injector is a midspan device. A midspan does not provide Ethernet to its ports. It does allow a data connection if used in combination with a switch. This provides the advantages of further cost reduction and further power reduction. On the other hand, a PoE switch combines the functions, providing both data and power. This provides the advantages that low-cost luminaires (only on/off functionality) can be combined with conventional luminaires having intelligence and receiving Ethernet commands enabling all sorts of advanced features (e.g. dimming).

In a modification of the first embodiment, the PoE switch 50 may be adapted to switch its main PSU (Power Supply Unit) 52 on and off. If all ports P1 to P5 are switched off, the main PSU 52 can be switched off, in order to reduce standby power. Additionally, the PoE switch 50 may have an auxiliary PSU (not shown in FIG. 3) with a lower voltage and lower power for the microprocessors. This PSU will stay on to receive commands to switch on the main PSU 52.

Figure 4:
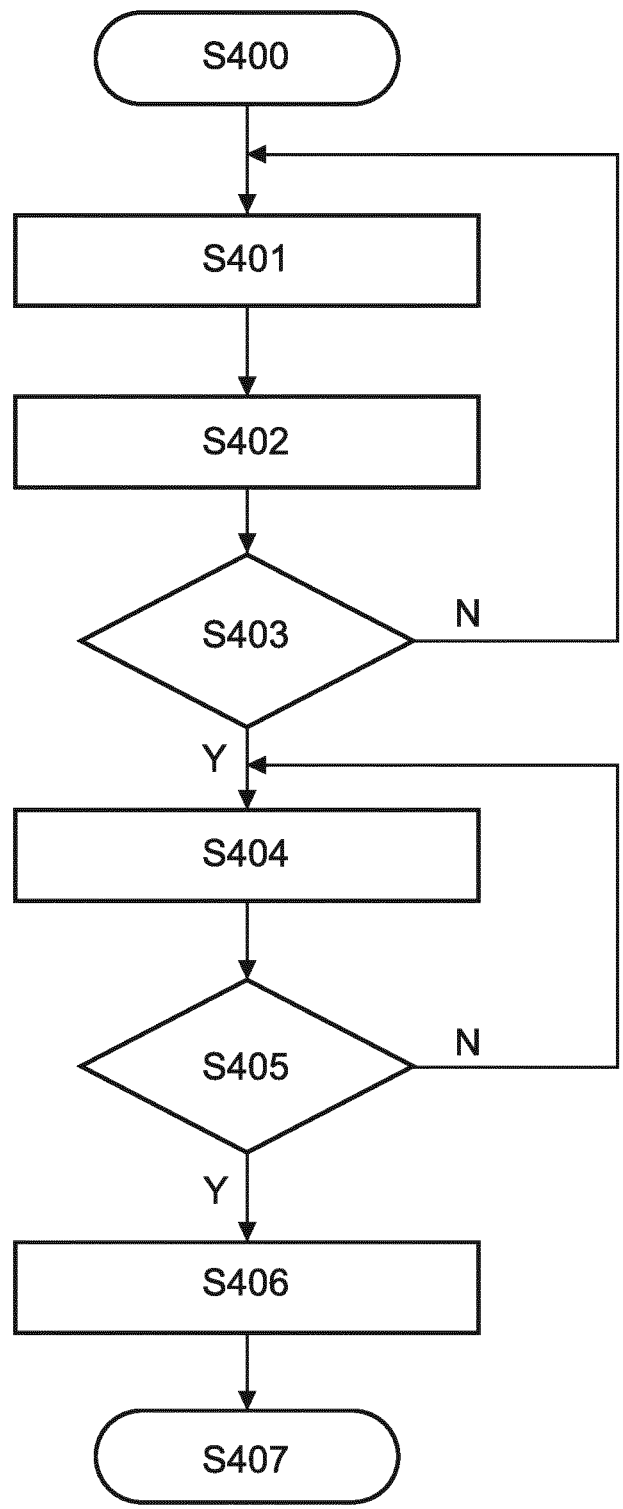
FIG. 4 shows a flow diagram of an automatic system configuration procedure according to a second embodiment.

FIG. 4 shows a flow diagram of an automatic system configuration procedure according to a second embodiment where a lighting control device (e.g. the light switch 70 of FIG. 3) controls PoE ports of a PoE switch with commands according to the SNMP protocol.

The procedure starts in step S400. First, the IP node of the lighting control device must find out the IP address of the PoE switch it is connected to. In step S401, this node will receive an IP address and network mask from a Dynamic Host Configuration Protocol (DHCP) server and can then scan all the IP addresses of its subnet to find hosts that offer SNMP. DHCP is a standardized networking protocol used on IP networks that dynamically configures IP addresses and other information that is needed for Internet communication. DHCP allows computers and other devices to receive an IP address automatically from a central DHCP server, reducing the need for a network administrator or a user from having to configure these settings manually.

In the next step S402 the IP node of the lighting control device determines if the host which offers SNMP is a switch and if the IP node of the lighting controller is connected to that switch. This can be done by querying which MAC addresses are stored for each network port. An SNMP host that is not a switch will not have the registers associated with the MAC list of a network switch. In step S403 the IP node of the lighting controller checks whether its MAC address has been found in one of the registers. If no IP address has been found in step S403, the procedure jumps back to step S401 and repeats the scanning process. As an alternative, the procedure may be stopped here. Otherwise, if a relevant IP address has been found in step S403, the lighting controller has discovered the IP address of the SNMP node of the PoE switch it is connected to and the procedure proceeds to step S404 to find out which ports on the PoE switch should be turned on/off.

Now that the lighting controller knows the IP address of the SNMP node on the switch it is connected to, it can monitor in step S404 the MAC lists that the discovered PoE switch maintains. A port with no associated MAC addresses is either not connected, or contains only PoE equipment without IP capabilities. In the next step S405 the lighting controller checks if port(s) with no associated MAC address have been found. If not, the procedure jumps back to step S404 and repeats the monitoring process. As an alternative, the procedure may be stopped here. If the lighting controller determines in step S405 that at least one port with no associated MAC address has been found, the procedure proceeds to step S406 and the detected ports are memorized (e.g. stored in a look-up table) for subsequent switching operation and the power distribution control system is now configured for proper operation. In step S407, the procedure ends.

The above procedure of FIG. 4, i.e. finding IP address of switch connected to, and finding out which ports contain dumb lamps, can be implemented in software by using standard SNMP commands on the IP node of the lighting controller.

With the above embodiments, low complexity, small size and low power consumption of the power distribution system can be achieved when only minimal functionality of the controlled load devices is required. In particular, the power consumption is reduced when the controlled load devices are off. Moreover, the size of the luminaires can be minimized since no intelligence needs to be implemented. However, the luminaires and the PoE switch are still compatible with more advanced PoE lighting systems. This is e.g. beneficial in any situation where advanced controls are not needed. It can seamlessly combines with intelligent luminaires.

To summarize, a system for controlling distribution of power to load elements via LAN connections has been described. Low cost luminaires or other load elements can be powered via LAN connections (e.g. by power over Ethernet (PoE)) without featuring an Internet Protocol (IP) node. This is attractive because with such a system the installation cost down benefits of PoE can be applied also to installations that do not require advanced controls. This means that to switch them on or off, the power supply on the LAN port of the switch must be enabled or disabled. When load elements and load controllers (e.g. lighting controllers or light switches) are connected to the same switch, they are automatically paired to each other. This can be achieved through use of a network management protocol capability that some network switches have. This allows for easy installation and automatic intuitive commissioning.

While the invention has been illustrated and described in detail in the drawings and foregoing description, such illustration and description are to be considered illustrative or exemplary and not restrictive. The invention is not limited to the disclosed embodiment with the lamps or luminaires as load devices. It can be implemented in connection with any type load devices for DC distribution networks, such as all kinds of low power loads like lighting equipment (sensors, switches, light sources etc.) or entertainment appliances like active speakers, internet radios, DVD player, set-top boxes and even television (TV) sets.

The proposed control system can be used to implement minimal control features into a PoE lighting network. It will provide simple on/off functionality and automatic commissioning based on the physical network infrastructure.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like the one indicated in FIG. 4 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A control device for controlling distribution of power to load elements via network connections, said control device being adapted to issue control commands of a network management protocol to a network switch in order to switch on or off selected local area network, LAN, ports of said network switch, through which said power is supplied to respective ones of said load elements, wherein said network management protocol is the Simple Network Management Protocol, SNMP;

wherein said control device comprises a wall switch or a sensor for detecting presence of people and initiating a power switching operation in response to a result of detection, or a user interface for manually initiating said power switching operation, or a building management system for controlling lighting based on sensor inputs; and, wherein said control device is adapted to discover what network switch it is connected to by employing a network scan and probing for its own network address in cache tables of a network management protocol compatible network switch.

2. The control device of claim 1, wherein said load elements are luminaires.

3. The control device of claim 1, wherein said control device is adapted to discover said selected LAN ports by checking which layer-2 address cache tables of available LAN ports of a discovered network switch are empty or do not have a link-up.

4. The control device of claim 1, wherein Power over Ethernet, PoE, is used for said distribution of power.

5. The control device of claim 1, wherein said network switch is a midspan device.

6. A system for controlling distribution of power to load elements via local area network, LAN, connections, said system comprising at least one control device according to any one of claims 1, 3, 4, and 5.

7. The system of claim 6, wherein said network switch is adapted to switch off a main power supply unit if all its LAN ports are switched off.

8. A method of controlling distribution of power to load elements via local area network, LAN, connections, said method comprising issuing control commands of a network management protocol to a network switch in order to switch on or off selected LAN ports of said network switch, through which said power is supplied to respective ones of said load elements, wherein said network management protocol is the Simple Network Management Protocol, SNMP; and, wherein said method further comprises discovering said network switch by employing a network scan and probing for an own network address in cache tables of a network management protocol compatible network switch.

9. The method of claim 8 wherein said method further comprises discovering said selected LAN ports by checking which layer-2 address cache tables of available LAN ports of said discovered network switch are empty or do not have a link-up.

10. A computer program product comprising a plurality of program code portions, stored in a non-transitory computer readable medium, for carrying out the method according to claim 8.

* * * * *